(12) United States Patent
McCannel

(10) Patent No.: US 6,173,901 B1
(45) Date of Patent: Jan. 16, 2001

(54) PROCESS FOR MAKING AN ENCODED CARD

(75) Inventor: Duncan McCannel, Eagan, MN (US)

(73) Assignee: Taylor Corporation, North Mankato, MN (US)

( * ) Notice: Under 35 U.S.C. 154(b), the term of this patent shall be extended for 0 days.

(21) Appl. No.: 09/358,737

(22) Filed: Jul. 21, 1999

(51) Int. Cl.$^7$ .............................. G06K 7/00; G06K 19/06
(52) U.S. Cl. ............................ 235/493; 283/61; 235/381; 235/436
(58) Field of Search .................................. 235/493, 375, 235/436, 456, 381; 283/61, 82, 83, 116, 62

(56) References Cited

U.S. PATENT DOCUMENTS

| | | | |
|---|---|---|---|
| 4,149,925 | 4/1979 | Mintz | 156/361 |
| 4,231,828 | 11/1980 | Mintz | 156/230 |
| 5,073,221 | 12/1991 | Waitts et al. | 156/253 |
| 5,254,525 | * 10/1993 | Nakajima et al. | 503/227 |
| 5,769,457 | * 6/1998 | Warther | 283/61 |
| 5,980,011 | * 11/1999 | Cummins et al. | 347/4 |
| 6,070,976 | * 6/2000 | Takagi et al. | 347/86 |

\* cited by examiner

*Primary Examiner*—Thien M. Le
(74) *Attorney, Agent, or Firm*—Schwegman, Lundberg, Woessner & Kluth, P.A.

(57) ABSTRACT

The present invention includes a method for rapidly producing encoded, ink-jet printed cards. The method includes providing an encodable and printable card and providing an electronic database with stored data. The method also includes encoding and printing the card by concurrently transferring electronically data from the database to an encoder and to a printer. The data printed on the card is verified for accuracy with a verification mechanism.

32 Claims, 6 Drawing Sheets

PROCESS FOR MAKING AN ENCODED CARD

BACKGROUND OF THE INVENTION

The present invention relates to a method for making an encoded card and to an apparatus for making an encoded card.

Encodable cards, such as magnetically readable cards, each comprise a main body that receives identification indicia and that carries an encodable medium. Information in the identification indicia of the card must match encoded information. Encodable cards have traditionally been made by imparting indicia on the main body, which is typically a polymeric substrate, using a technology such as thermal imaging. An encodable strip comprised of encodable material, which may be a magnetic strip, is encoded with a code that is compatible with the indicia.

The rate of production of cards printed by thermal imaging and encoding depends upon the combined speed of printing the cards, transferring the cards to the encoder and encoding the cards. With conventional thermal imaging-based processes, encodable cards have been produced at a maximum rate of about 1500 cards per hour.

Card production using ink jet imaging has required that encoding the cards and imaging the cards be performed in separate processes. The separate process format has limited the speed at which encoded, imaged cards may be produced.

SUMMARY OF THE INVENTION

One embodiment of the present invention includes a method for rapidly producing encoded, ink-jet printed cards. The method includes providing an encodable card with an encodable medium and providing an electronic database with stored data. The method further includes concurrently transmitting data from the database for ink-jet printing indicia on the card to an ink-jet printer and transmitting data for encoding the card, to an encoding assembly. The method further includes encoding the card by electronically transferring data from the database to the encodable card and printing the card with indicia from the database.

Another embodiment of the present invention includes an apparatus for rapidly producing encoded, ink-jet printed cards. The apparatus comprises an encoder, an ink-jet printer, and a file for electronically storing encodable, printable data. The apparatus further includes a mechanism for electronically transmitting the encodable, printable data substantially simultaneously from the file to the encoder and to the printer.

Another embodiment of the present invention includes a method for rapidly encoding and ink-jet printing an encodable card. The method comprises providing an encodable, printable card and providing an electronic database with stored data. The method also comprises encoding and ink-jet printing the card by electronically transferring data from the database substantially simultaneously, to an ink-jet printer and to an encoder.

One other embodiment of the present invention includes an apparatus for producing encoded cards. The apparatus comprises an encoder and a mechanism for electronically storing encodable data. The apparatus also includes a mechanism for rapidly transferring encodable data from the mechanism for electronically storing the data to the encoder.

Another embodiment of the present invention includes a device for conveying encodable, printable cards. The device includes a non-jointed table and at least one belt of substantially uniform height and surface topography positioned on the table. The device also includes a transfer mechanism for transferring cards from storage to the belt.

One other embodiment of the present invention includes a system for transferring information to ink jet print and to encode a card. The system includes a database comprising stored data and a mechanism for concurrently transmitting data for ink jet printing to an ink jet printer and data for encoding to an encoder.

Another embodiment of the present invention includes a device. The device comprises a main body comprising styrene or polyvinyl chloride. The main body has ink jet printed indicia and an encodable region.

DETAILED DESCRIPTION

Figure 1:
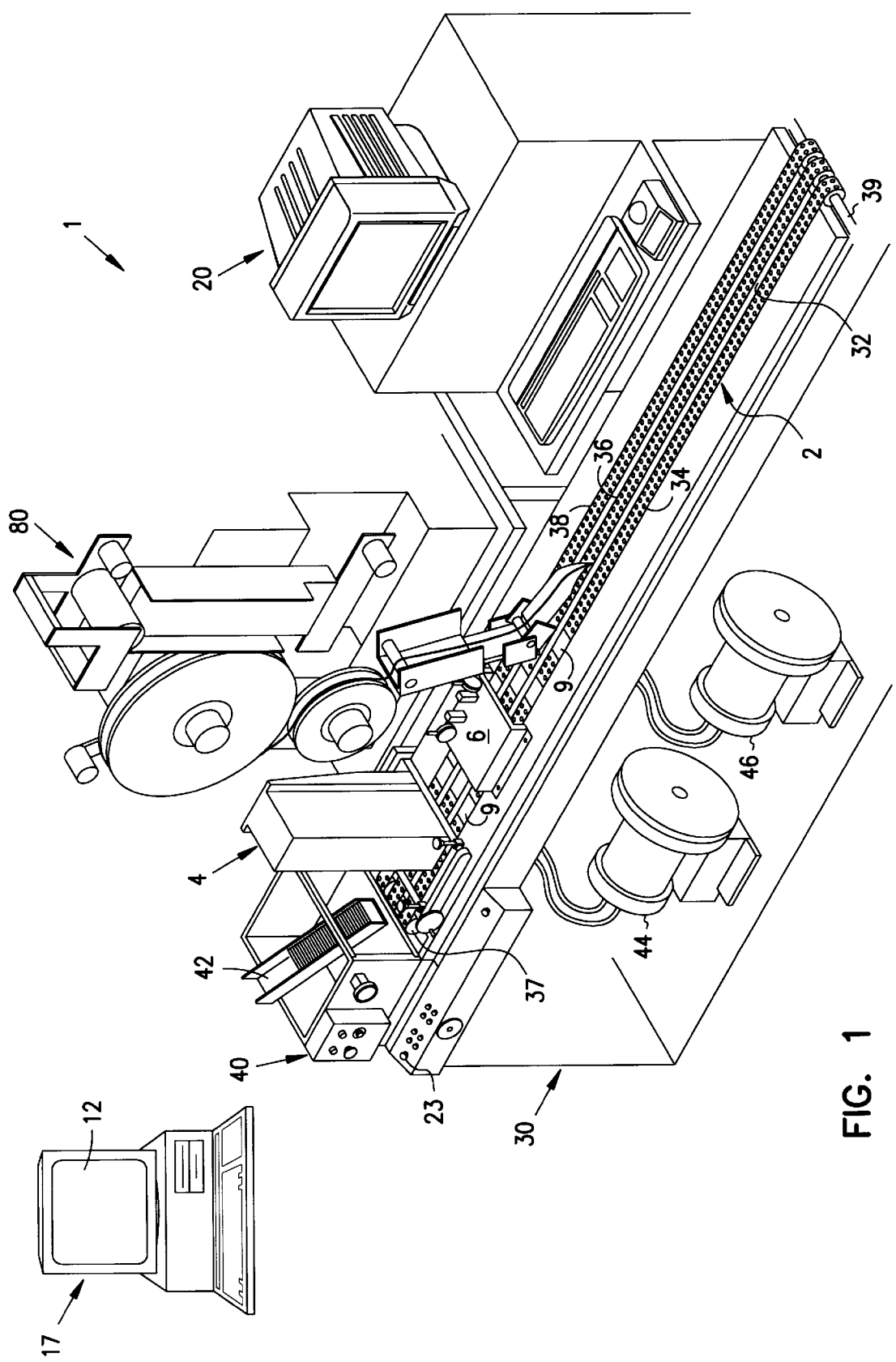
FIG. 1 is a perspective view of one embodiment of the apparatus of the present invention for rapidly encoding and printing an encodable card.

The method of the present invention continuously produces an encoded, ink-jet printed card, in a single process, at a maximum rate of about 30,000 cards per hour. The method comprises providing a network file of electronic identification data illustrated schematically at 12 in FIG. 2; providing an ink-jet printer 4, an encoder 6, and a controller 14 that each receive, translate, and control data transfer; providing a card 9, illustrated in FIG. 1, with encodable media 11 and a card conveying assembly 2 for transporting the card 9 between the ink-jet printer 4 and encoder 6; concurrently transferring identification data to the ink-jet printer 4 and encoder 6 from the network file 12; and comparing printed and encoded data on the card 9 to data in the network file 12 with a comparator, such as is shown at 20 in FIG. 1.

The network file 12 and controller 14 may be activated within or by a personal computer 17 which is positioned either proximal to or remote from the assembly shown in FIG. 1. Information in the network file 12 may be transmitted telemetrically or through a wire medium. The controller 14 may communicate instructions telemetrically or through a wire medium.

Figure 2:
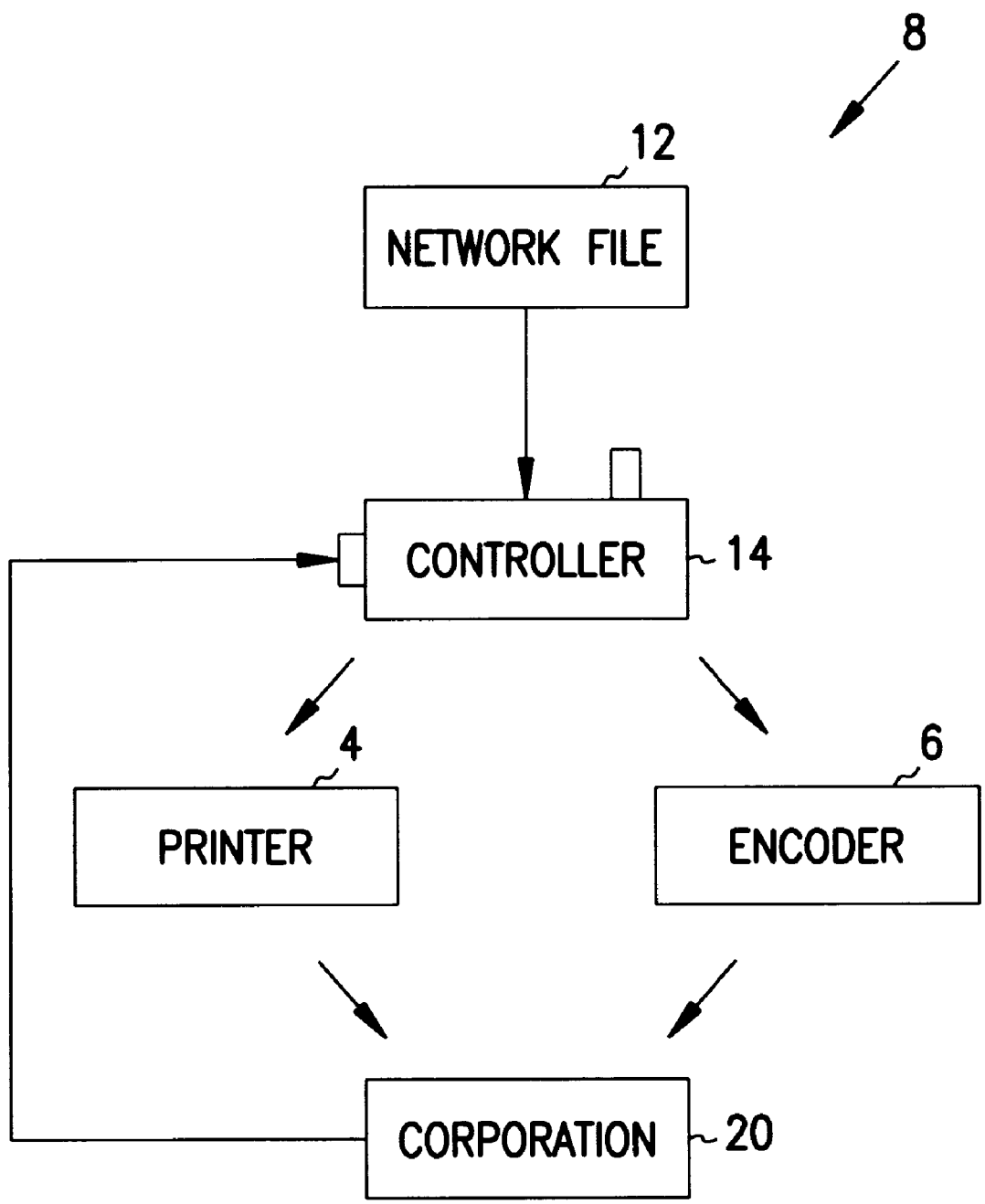
FIG. 2 is a schematic view of one embodiment of a control scheme of the present invention, for rapidly encoding and printing an encodable card.
Figure 4:
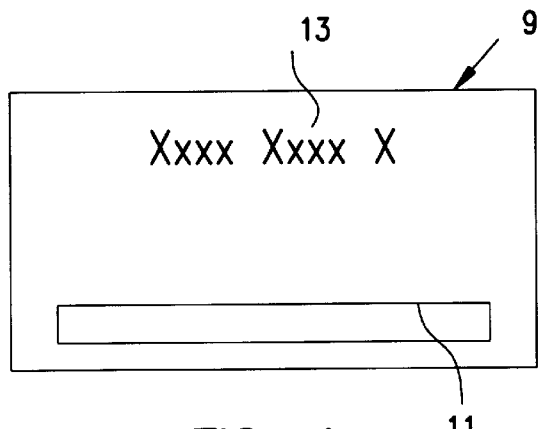
FIG. 4 is a top plan view of one embodiment of an encodable identification produced by the method of the present invention.

One embodiment of the device of the present invention, illustrated generally at 1 in FIG. 1, includes a card conveying assembly 2, an ink-jet printer head 4, an encoder 6, and an electronic data transfer configuration 8, illustrated schematically in FIG. 2, for transferring data from a network file 12 to mark indicia 13 on a card 9, illustrated in FIG. 4, and encoded magnetic media 11 on the card 9. The electronic transfer configuration 8 may be activated within the personal computer 17 positioned either proximal to or remote from the device 1.

As used herein, the term "card" refers to an article that carries magnetic material or other encodable material in an information-yielding arrangement. The card also includes printed indicia that complements the encoded information in the encodable material.

As used herein, the term "ink-jet printer" is used interchangeably with "video jet printer." The term, "ink-jet printer," refers to a device that may comprise a computer activated single nozzle that oscillates across a substrate to produce an image. An ink-jet printer may, in another embodiment, include a bank of nozzles, each of which is controlled by a computer program. Ink-jet printing may also include a bubble jet, which uses heat to produce bubbles that form ink droplets.

As used herein, the term "print" or "printing" refers to imaging. Imaging comprises indicia such as letters and other symbols as well as compositions such as scenes, portraits and so on.

The card conveying assembly 2 includes a joint-free table, such as is illustrated at 30 in FIG. 1. The joint-free table 30 reduces vibration of the device 1. The joint-free table 30 is positioned beneath the encoder 6, printer 4 and supports a conveying mechanism 32. The conveying mechanism 32 includes belts 34, 36 and 38. The belts 34, 36 and 38 have a uniform surface topography and have a uniform height over the length of each belt and from belt-to-belt. While three belts 34, 36, and 38 are described, it is believed that about two belts to about seven belts are suitable for use in the device of the present invention, particularly for cards which are not symmetrical, or for cards which are large. A single belt is suitable for use for conventional, rectangular identification cards. It has surprisingly been found that the use of multiple belts 34, 36 and 38 has improved conveyance reliability, even at high speeds. The belts 34, 36 and 38 are taken up by take-up rollers 37 and 39 at each end of the table 30.

The conveying mechanism 32 further includes a card transfer mechanism such as a rotary mechanism with arms that terminate in suction pads for transferring cards from a tray 42. The card transfer mechanism may be a stream transfer mechanism or may be a vacuum transfer mechanism. FIG. 1 illustrates vacuum pumps 44 and 46 that pull a vacuum on the vacuum transfer mechanism. It is believed that other types of high speed card transfer mechanisms are also suitable for use in the present invention.

In addition to ink-jet printing and encoding, other operations may be performed on the cards. These other operations include rotary hot stamping, and application of additional components such as foils and scratch-off mechanisms. The device 1 additionally includes a labeler 80 for labeling the cards.

While ink-jet printing and encoding are described in a particular order, it is understood that the order of operation of the device and process of the present invention may be reversed. Specifically, encoding may be performed before printing. Furthermore, data utilizing operations may be incorporated into the method and apparatus of the present invention.

One embodiment of the electronic data transfer configuration 8, illustrated schematically in FIG. 2, comprises the network file 12 that electronically stores data for transferring to a card, such as a credit card, a phone card or other type of identification card. Data from the network file 12 is received by a controller 14 that substantially concurrently controls transfer of the electronic data to a printer 4, such as an ink jet printer, and an encoder 6. A comparator 20 compares printed indicia on the card and code imparted to magnetic media on the card to electronic data designated for the card. Any discrepancy is relayed back to the controller 14 which adjusts data feed to the ink-jet printer 4 and encoder 6.

By monitoring and controlling the printing and encoding of each card by monitoring flow and translation of data, the device 1 of the present invention performs printing and encoding of cards much more rapidly and accurately than has heretofore been contemplated. Conventional methods monitor and control the printing process and the encoding process as separate operations by monitoring spacial position of a phantom card as a point of reference. The phantom card speed and position are used to control timing and production rates of a printing operation and, separately, an encoding operation. For example, a timing chain is used to control card spacing and/or a conveyer calibrated to track card position. With the present invention, data is fed sequentially to each operation and is queued. As each card is passed over a sensor positioned under or proximal to a belt, the sensor is triggered and one sequential data transfer action is performed.

Ink-jet printing and encoding have been processes which have been separately performed because these processes have typically been performed at different rates of production. It has not been contemplated that the processes could be combined because the frame of reference, the phantom card frame of reference, did not suggest combining the processes. By changing the point of reference to movement of data rather than movement of the card, it has surprisingly been found that the processes of printing and encoding can be combined and can be performed at a high rate of speed.

Each card is printed with a high speed printing process such as video jet printing or ink jet printing either before or after the rapid encoding step. The steps of printing and encoding are performed as part of a single process. Data for imprinting or encoding is transmitted to a printing head 4 and encoder 6 substantially concurrently. The card conveying mechanism 32 conveys cards of virtually any symmetry to the printer and encoder, rapidly.

In one embodiment, conveyance of the cards in the process between printing and encoding occurs by the belts 34, 36 and 38 on the joint-free table 30, whereby cards are conveyed from the encoder 4 to the printer 6 or from the printer 6 to the encoder 4, as shown in FIG. 1. The belts 34, 36 and 38, comprise three belts positioned parallel to each other. As discussed, other belt configurations may be suitable for use in the device of the present invention. With the belts 34, 36 and 38 and the joint-free table 30, any problems of vibration are significantly reduced. It is believed that other conveyance mechanisms are suitable for use in the present invention provided these mechanisms have a uniform height and surface topography, do not cause or aggravate vibration and provided that the conveyance mechanisms can operate at a high rate of speed.

The method of the present invention increases the rate of encoded card production to a factor that is about twenty times faster than the rate of traditional methods, such as thermal imaging. The production rate is increased because the rate of transfer of data from an electronic network database file to the encodable portion and to produce indicia is significantly increased, because the ink-jet printing and rapid encoding are performed as a single operation, and because the spacial transfer of cards is performed reliably at an increased rate of speed. It has heretofore not been considered that encodable card production and printed card production rates could be so dramatically increased. It has not been appreciated that changing the frame of reference from card conveyance in space to efficient data transfer would result in such as dramatic increase in production speed.

The method of the present invention may be used to fabricate encoded cards of virtually any size or shape or complexity. Thickness of the cards may range from about 4 to 50 mils. Cards fabricated with the method of the present invention include but are not limited to "swipe" cards, as well as to cards of greater structural complexity, such as multi-panel cards. A multiple belt construction, such as is shown for belts 34, 34, and 38 in FIG. 1 permits rapid printing and encoding of multi-panel and asymmetrical cards.

The encodable portion of the card 11 may include laminated flush magnetic strips, hot strips, label magnetic strips or high/low magnetic strips or other types of encodable format. High/low magnetic strips are made of high and low coercivity materials. The magnetic strips are applied by conventional techniques such as hot foil transfer, wet coating, lamination and so forth.

The card, or other type of substrate, may be fabricated from polyvinyl chloride and other vinyl chloride polymers, polystyrene and other methyl methacrylate/butadiene/styrene polymers or acrylonitrile/butadiene/styrene polymers, P-260, PETG and APET and other polymeric materials that have a capacity to dry impinging drops of ink by absorption without wicking or spreading of the ink, for maximum printing density and sharpness. The polymeric material may be coated with a transparent layer such as silica or gelatin.

Figure 5A:
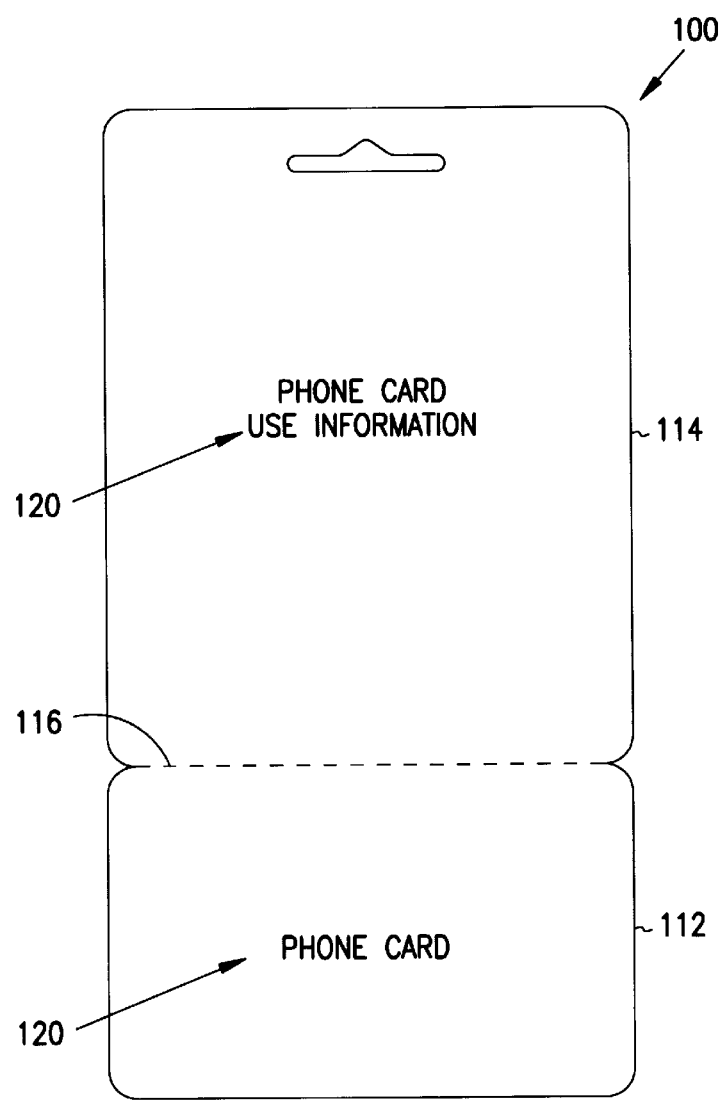
FIG. 5a is a front view of one printed, encoded article embodiment of the present invention.
Figure 5B:
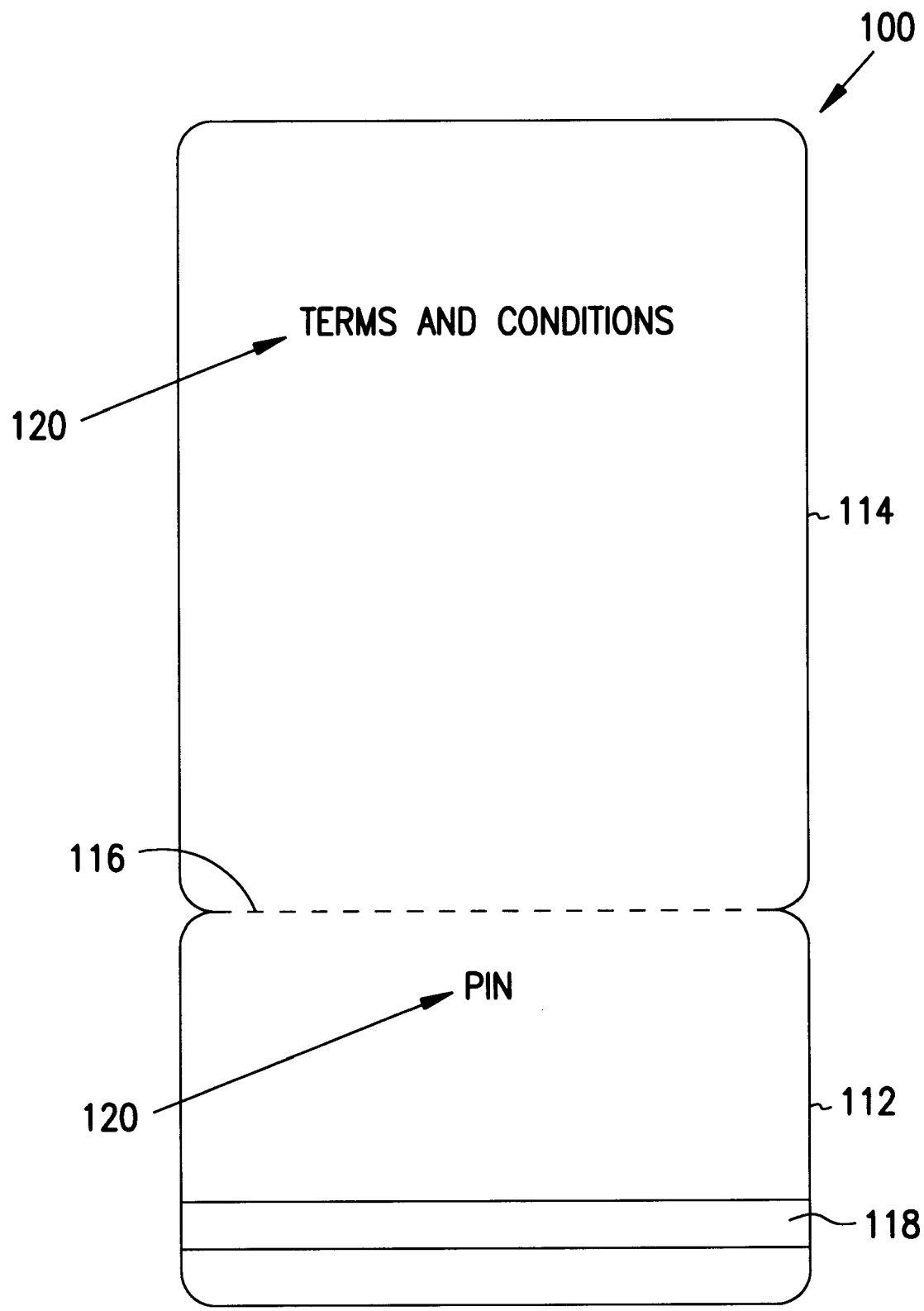
FIG. 5b is a rear view of the embodiment of FIG. 5b.

It has surprisingly been found that the method of the present invention is usable to make a device comprising a card, such as a credit card and a card holder, such as is illustrated at 100 in FIGS. 5a and 5b. It has not heretofore been possible to satisfactorily produce a card or a device such as is shown in FIGS. 5a and 5b of polystyrene or poly vinyl chloride. It has not heretofore been possible to make devices of the size and complexity of the device of FIGS. 5a and 5b. The device 100 includes a card portion 112 and a holder portion 114. The card portion 112 is defined, in part, by perforations 116. The card portion 112 includes an encodable region 118. The device 100 includes indicia 120 on the card portion 112 and the holder portion 114. The indicia 120 are ink jet printed.

Figure 6:
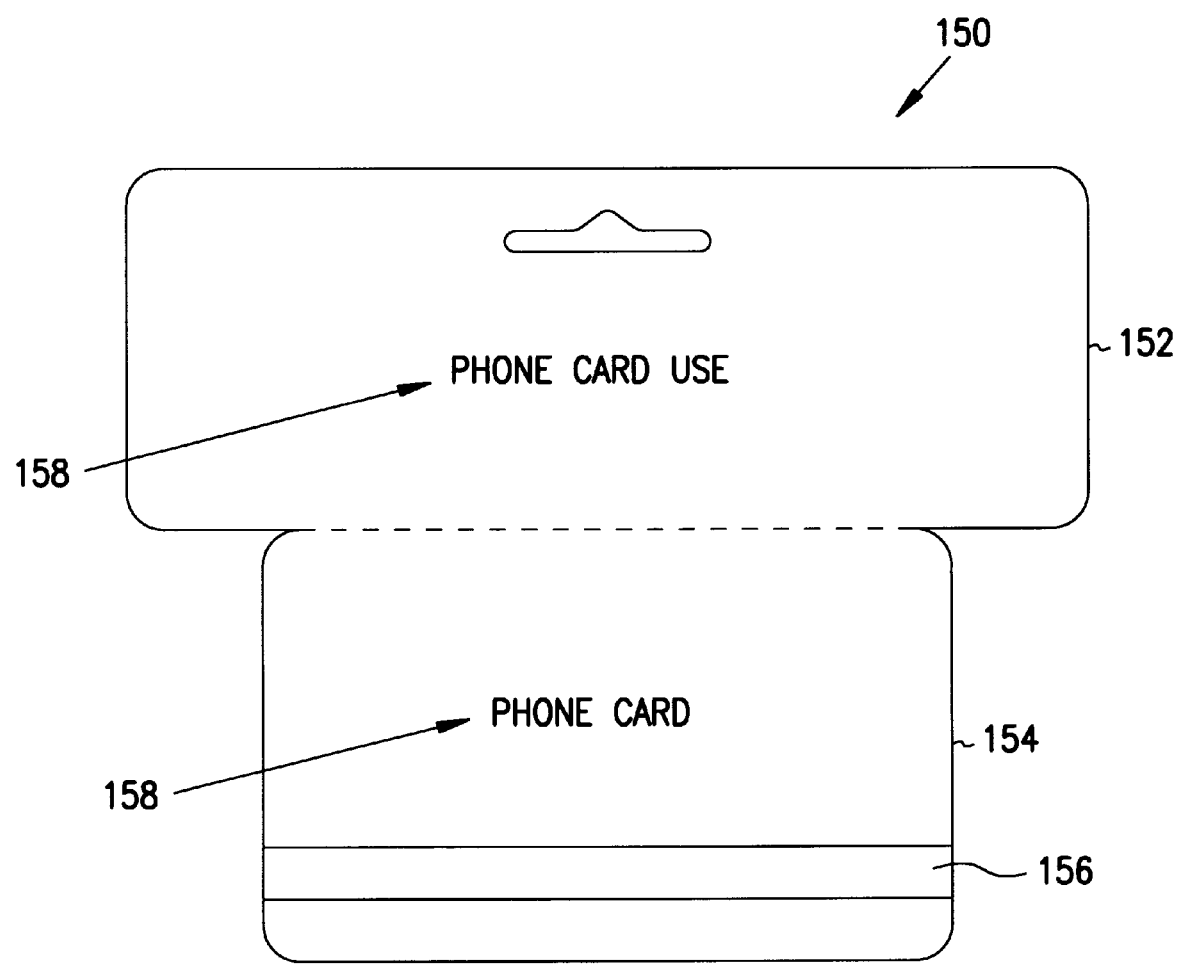
FIG. 6 is another embodiment of the device of the present invention.

One asymmetrical device which can be ink jet printed and encoded with the method of the present invention is shown at 150 in FIG. 6. The device 150 is also made with a material such as styrene or poly vinyl chloride. The device 150 includes a card holder portion 152 and an encodable card 154 with encodable region 156. The device 150 is asymetrical in shape. The device 150 also includes indicia 158 on both portions of the card.

Once the card is printed and encoded, the card may be cut using any conventional cutting technology such as die cut, or punch or high die or guillotine cut. Cutting may also occur by a technique such as laser cutting or patterning.

Figure 3:
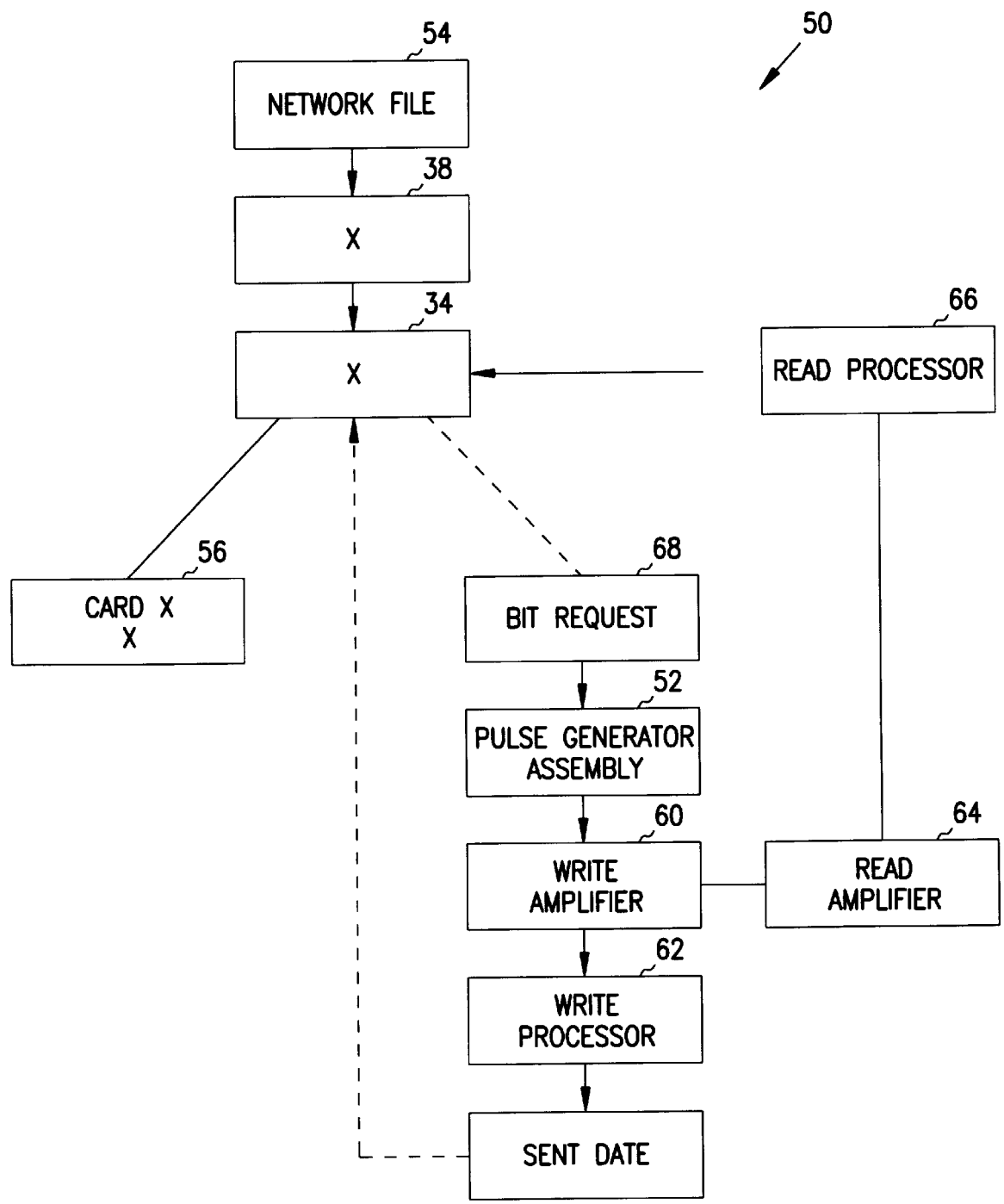
FIG. 3 is a schematic view of one embodiment of a control scheme of the present invention for rapidly encoding an encodable card.

One embodiment of a method for encoding cards of the present invention, illustrated schematically, generally at 50 in FIG. 3, includes a pulse generator assembly 52, a database 54 and a master controller 14. The master controller 14 receives a start signal from a start sentinel 38 to receive data from the database 12 for use by the pulse generator assembly 52. A "card present" sensor 56 is in an activated mode. The pulse generator assembly 52 requests data bits from a bit requester 58. Data received from the bit requester 58 is sent to a write amplifier 60. The write amplifier 60 transmits the data to a write processor 62 and a read amplifier 64. The write processor 62 completes the encoding and sends a signal to the bit requester 58 to send data. The read amplifier 64 sends a signal to a read processor 66 to check for errors and to compile the data in ASCII. A "card present reset" breadboard resets the "card present" signal generated by the read amplifier to increase the card throughput by permitting the cards to be spaced as close as 0.75 inches.

A host computer data management program provides for encoding a twelve digit number on each card. The number is incremented between each card. The program performs functions of receiving data requests from the write processor board 62 on COM 2, responding by sending card data and preparing the next message. The program also receives messages from the read processor board 66. The program verifies accurate transcription of the message in printed indicia and encoded media. It also builds a file of bad and missed encoded messages. The program also provides for an operator, a living being, to interface in order to enter the initial message, increment or decrement the message manually, view the error list, and to perform single encode/verify cycles.

Substantially the same control method is used to print indicia on the card. A print assembly is substituted for the pulse generator assembly 52 of FIG. 3. The master controller 14 substantially concurrently controls both the encoding and printing processes.

When the encoder 4 receives the code, the encoder 4 encodes the encodable portion 11 of the card 9. The encoder 4 sends a message to the master controller 36 that the code has been delivered to the encodable portion 11.

In one embodiment, when the controller 14 receives the signal from the encoder 4, the controller 14 prompts a belt actuator 23 to move the belts 34, 36 and 38 upon which each of the cards 9 is positioned. In another embodiment, the belts 34, 36 and 38 are timed to travel at a speed compatible with the encoding and printing functions.

The method and apparatus of the present invention may comprise any one of the many types of ink jet printing processes. These processes comprise a computer activated single nozzle that oscillates across a substrate to produce an image. The processes also include a bank of nozzles, each of which is digitally controlled by a computer program. Further included is a bubble jet, which uses heat to produce bubbles that form ink droplets. Also included is phase change technology in which color sticks that are solid at room temperature undergo two phase changes during printing—one when the stick melts to form liquid droplets and one when the ink droplets hit a surface and solidify.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention.

What is claimed is:

1. A method for rapidly producing encoded, ink-jet printed cards, comprising:

providing an encodable card;

providing an electronic database with stored data;

concurrently transmitting data for ink-jet printing indicia on the card to a printer and for encoding the card to an encoding assembly;

encoding the card by electronically transferring data from the database to the encodable card; and ink-jet printing the card with indicia transmitted by the data.

2. The method of claim 1 and further including providing a conveying mechanism for moving the encodable card between ink-jet printing and encoding the card.

3. The method of claim 1 and further including providing an encoder for encoding the card.

4. The method of claim 1 wherein the rate for producing the encoded, ink-jet printed cards is about 30,000 cards per hour.

5. The method of claim 1 and further comprising verifying accuracy of indicia printed on the card.

6. The method of claim 1 and further comprising verifying accuracy of encoded media on the card.

7. The method of claim 2 wherein the conveying mechanism includes at least one moving belt.

8. The method of claim 2 wherein the conveying mechanism further comprises a non-jointed table.

9. The method of claim 2 wherein the conveying mechanism further comprises a card transfer assembly.

10. The method of claim 1 and further including verifying the accuracy of printed indicia and encoded media on the card.

11. An apparatus for rapidly producing encoded, printed cards, comprising:

an encoder;

an ink-jet printer;

a file for electronically storing encodable, printable data; and a mechanism for electronically transmitting the encodable, printable data substantially simultaneously from the file to the encoder and to the ink-jet printer.

12. The apparatus of claim 11 and further including a mechanism for conveying the cards between the ink-jet printer and the encoder.

13. The apparatus of claim 11 wherein the mechanism for conveying the cards is at least one belt.

14. The apparatus of claim 11 wherein the mechanism for conveying the cards comprises two or more belts.

15. The apparatus of claim 11 wherein the mechanism for printing the cards is an ink jet printer.

16. The apparatus of claim 11 and further comprising a mechanism for verifying accuracy of encoded media on the card.

17. The apparatus of claim 11 and further comprising a mechanism for verifying accuracy of indicia printed on the card.

18. A method for rapidly encoding and printing an encodable card, comprising:

providing an encodable, printable card;

providing an electronic database with stored data; and encoding and printing the card by electronically transferring data from the database substantially simultaneously to a printer and to an encoder.

19. An apparatus for rapidly producing encoded cards, comprising:

an encoder; and a mechanism for rapidly transferring the encodable data from the mechanism for electronically storing the data to the encoder.

20. The apparatus of claim 19 and further comprising a mechanism for conveying the card.

21. A device for conveying encodable, printable cards, comprising:

a non-jointed table;

at least one belt of substantially uniform height and surface topography portioned on the table; and a transfer mechanism for transferring the cards from storage to the belt.

22. The device of claim 21 comprising two or more belts.

23. The device of claim 21 wherein the transfer mechanism comprises one or more vacuum pumps for transfer by application of a vacuum to the cards.

24. The device of claim 21 wherein the transfer mechanism is a stream feed.

25. A system for transferring information used to ink jet print and encode a card, comprising:

a database comprising stored data; and a mechanism for concurrently transmitting data for ink jet printing to an ink jet printer and data for encoding to an encoder.

26. The system of claim 25 and further comprising a comparator for comparing information ink jet printed to information in the database.

27. The system of claim 25 and further comprising a comparator for comparing information encoded to information in the database.

28. The system of claim 25 and further comprising a comparator that compares information ink jet printed to information in the database and that compares information encoded to information in the database substantially concurrently.

29. A device, comprising:

a main body comprising styrene or polyvinyl chloride with ink jet printed indicia and an encodable region.

30. The device of claim 29 wherein the main body comprises a card portion and a card holder portion.

31. The device of claim 29 wherein the main body is asymetrical.

32. The device of claim 29 wherein the main body is a card.

* * * * *

Disclaimer 6,173,901B1—Duncan McCannel, Eagan, MN. PROCESS FOR MAKING AN ENCODED CARD. Patent dated January 16, 2001. Disclaimer filed March 8, 2001, by the assignee, Taylor Corporation.

Hereby enters this disclaimer to claims 29, 30, 31 and 32 of said patent.

*(Official Gazette, July 31, 2001)*